United States Patent
Moniz et al.

(10) Patent No.: US 10,364,752 B2
(45) Date of Patent: Jul. 30, 2019

(54) SYSTEM AND METHOD FOR AN INTEGRAL DRIVE ENGINE WITH A FORWARD MAIN GEARBOX

(71) Applicant: GENERAL ELECTRIC COMPANY, Schenectady, NY (US)

(72) Inventors: Thomas Ory Moniz, Loveland, OH (US); Raymond Felix Patt, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 362 days.

(21) Appl. No.: 15/156,476

(22) Filed: May 17, 2016

(65) Prior Publication Data

US 2017/0335774 A1 Nov. 23, 2017

(51) Int. Cl.

| F02C 7/36 | (2006.01) |
|---|---|
| F01D 25/20 | (2006.01) |
| F02K 3/06 | (2006.01) |
| F02C 3/107 | (2006.01) |
| F02C 7/20 | (2006.01) |
| F01D 25/24 | (2006.01) |
| F02C 3/04 | (2006.01) |

(Continued)

(52) U.S. Cl.
CPC ............... *F02C 7/36* (2013.01); *F01D 25/20* (2013.01); *F01D 25/24* (2013.01); *F02C 3/04* (2013.01); *F02C 3/107* (2013.01); *F02C 7/06* (2013.01); *F02C 7/20* (2013.01); *F02K 3/06* (2013.01); *F04D 29/522* (2013.01); *F05D 2220/323* (2013.01); *F05D 2220/3217* (2013.01); *F05D 2240/35* (2013.01); *F05D 2240/90* (2013.01); *F05D 2250/30* (2013.01); *F05D 2260/40311* (2013.01); *F05D 2260/98* (2013.01); *Y02T 50/671* (2013.01)

(58) Field of Classification Search
CPC ... F01D 25/20; F02C 7/20; F02K 3/06; F05D 2220/3217; F05D 2250/30
See application file for complete search history.

(56) References Cited

U.S. PATENT DOCUMENTS

| 3,902,822 A | 9/1975 | Andrews et al. |
|---|---|---|
| 4,722,666 A | 2/1988 | Dennison et al. |
| 4,815,273 A | 3/1989 | Rudolph et al. |

(Continued)

FOREIGN PATENT DOCUMENTS

| EP | 0 203 881 A1 | 12/1986 |
|---|---|---|
| EP | 2 811 120 A1 | 12/2014 |

OTHER PUBLICATIONS

International Search Report and Written Opinion issued in connection with corresponding PCT Application No. PCT/US2017/027299 dated Jun. 28, 2017.

*Primary Examiner* — Scott J Walthour
(74) *Attorney, Agent, or Firm* — Dority & Manning, P.A.

(57) ABSTRACT

The gas turbine engine includes a core engine, a low pressure turbine, a fan assembly, a gearbox, and a lubrication scavenge pump. The core engine includes a high pressure compressor, a combustor, and a high pressure turbine configured in a serial flow arrangement. The low pressure turbine is positioned axially aft of the core engine. The fan assembly is positioned axially forward of the core engine. The gearbox is positioned axially forward of the fan assembly. The lubrication scavenge pump is positioned forward of the gearbox.

19 Claims, 8 Drawing Sheets

(51) Int. Cl.
    *F02C 7/06*         (2006.01)
    *F04D 29/52*      (2006.01)

(56) References Cited

U.S. PATENT DOCUMENTS

| | | | |
|---|---|---|---|
| 4,934,140 A * | 6/1990 | Dennison | F02C 7/20 |
| | | | 244/54 |
| 5,201,844 A | 4/1993 | Greenwood et al. | |
| 7,526,913 B2 | 5/2009 | Orlando et al. | |
| 7,726,113 B2 | 6/2010 | Orlando et al. | |
| 7,955,046 B2 | 6/2011 | McCune et al. | |
| 8,083,482 B2 | 12/2011 | Serven et al. | |
| 2008/0022653 A1 | 1/2008 | Schilling | |
| 2009/0151317 A1* | 6/2009 | Norris | F02C 3/107 |
| | | | 60/39.162 |
| 2012/0257960 A1 | 10/2012 | Reinhardt et al. | |
| 2014/0155219 A1* | 6/2014 | McCune | F01D 15/12 |
| | | | 475/331 |

* cited by examiner

SYSTEM AND METHOD FOR AN INTEGRAL DRIVE ENGINE WITH A FORWARD MAIN GEARBOX

BACKGROUND

The field of the disclosure relates generally to gas turbine engines and, more particularly, to a method and system for an integral drive engine with a forward main gearbox.

Gas turbine engine assemblies generally include a fan assembly, a low pressure compressor, a core engine, and a low pressure turbine in a serial flow configuration. The low pressure compressor is driven by the low pressure turbine, rotating at approximately the same speed as the low pressure turbine. A frame supports the gas turbine engine between the low pressure compressor and the core engine. This frame tends to increase the length of the gas turbine engine assembly and thereby also tends to increase the weight and cost of the gas turbine engine assembly. Moreover, the low pressure compressor rotating at a relatively high speed, for example, approximately the low pressure turbine speed, highly loads the low pressure compressor causing it to operate at a non-optimal pressure ratio than might otherwise be attained.

BRIEF DESCRIPTION

In one aspect, a gas turbine engine assembly is provided. The gas turbine engine includes a core engine, a low pressure turbine, a fan assembly, a gearbox, and a lubrication scavenge pump. The core engine includes a high pressure compressor, a combustor, and a high pressure turbine configured in a serial flow arrangement. The low pressure turbine is positioned axially aft of the core engine. The fan assembly is positioned axially forward of the core engine. The gearbox is positioned axially forward of the fan assembly. The lubrication scavenge pump is positioned forward of the gearbox.

In another aspect, a method of assembling a three-frame gas turbine engine is provided. The method includes providing a core gas turbine engine including a high pressure compressor, a combustor, and a high pressure turbine coupled together in axial flow communication. The method also includes coupling the core gas turbine engine to a forward frame member and a middle frame member. The method further includes coupling a low pressure turbine to a first shaft axially aft of the middle frame member. The method also includes coupling an aft frame member to the low pressure turbine axially aft of the low pressure turbine. The method further includes coupling a fan assembly to the first shaft axially forward of the forward frame member. The method also includes coupling a gearbox to the first shaft axially forward of the fan assembly.

In yet another aspect, a front rotor of a gas turbine engine assembly is provided. The front rotor of a gas turbine engine assembly includes a low pressure compressor, a fan assembly, a gearbox, and a lubrication scavenge pump. The fan assembly is positioned axially forward of the low pressure compressor. The gearbox is positioned axially forward of the fan assembly. The lubrication scavenge pump is positioned forward of the gearbox.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a perspective view of an aircraft.

FIG. 2 is a schematic cross-sectional view of a gas turbine engine in accordance with an exemplary embodiment of the present disclosure that may be used with the aircraft shown in FIG. 1.

FIG. 3 is a side elevation view of a forward portion of the turbofan engine shown in FIGS. 1 and 2.

FIG. 4 is a perspective view of the gearbox housing shown in FIG. 3.

FIG. 5 is a cut-away side elevation view of the gearbox housing shown in FIG. 3.

FIG. 6 is a perspective cut-away view of the gearbox housing shown in FIG. 3.

FIG. 7 is a perspective cut-away view of the gearbox housing shown in FIG. 3.

FIG. 8 is a flow diagram of a method of constructing the turbofan engine shown in FIGS. 1 and 2.

Figure 1:
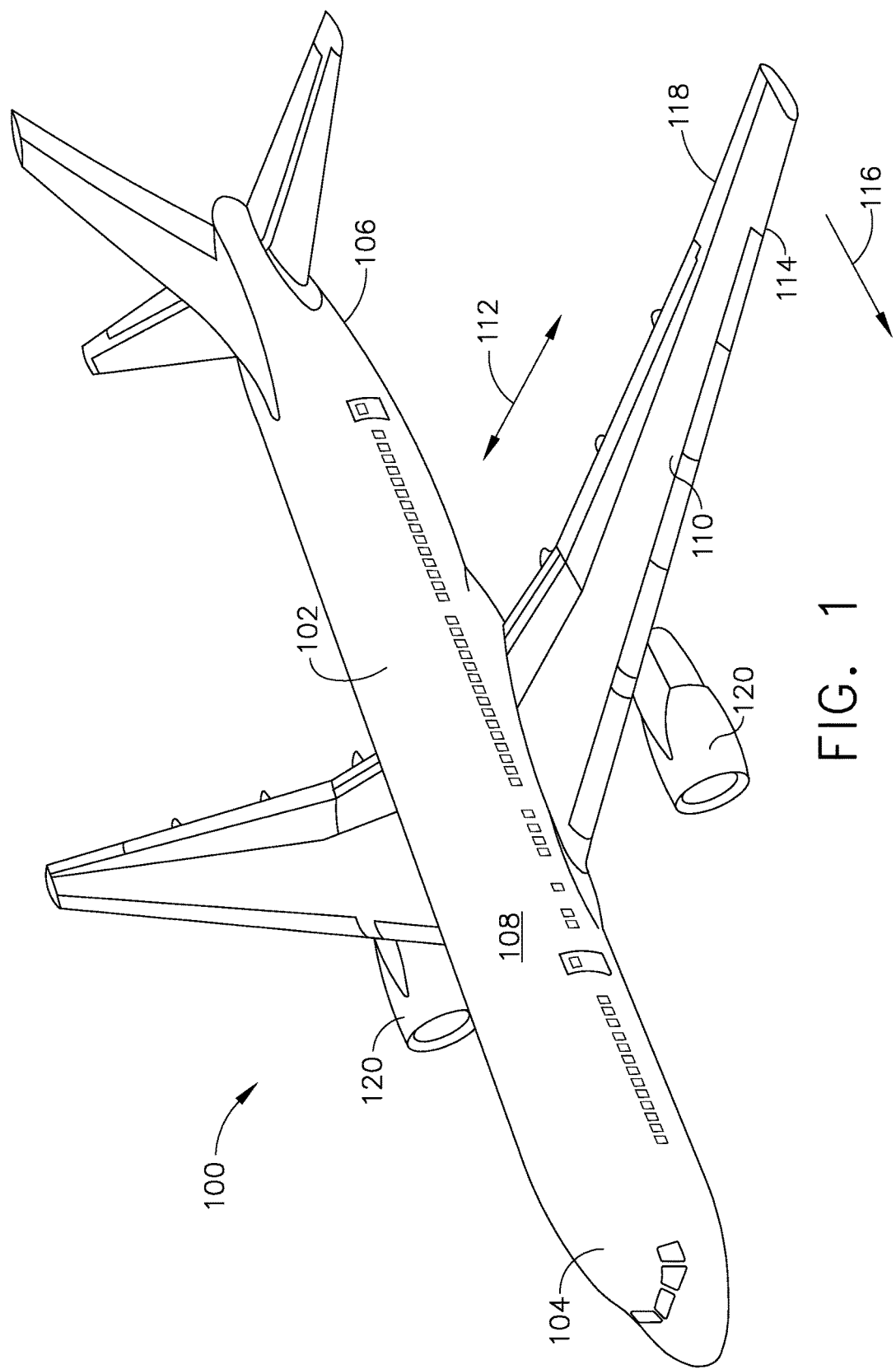
FIGS. 1-8 shows example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a method and system for an aircraft engine with a forward gearbox.

Embodiments of an integral drive gas turbine engine described herein provide a shorter and lighter gas turbine engine architecture than known gas turbine engines. Gas turbine engine assemblies using integral drive with high speed low pressure compressors typically require a frame between the low pressure compressor and the fan assembly to support a gearbox to drive the fan assembly. This frame tends to increase the length of the gas turbine engine assembly and thereby also increases weight and cost of the gas turbine engine assembly. By attaching the low pressure compressor directly to the fan assembly and locating the gearbox axially forward of the fan assembly, a frame can be eliminated.

The gas turbine engine assembly includes a core engine including a high pressure compressor, a combustor, and a high pressure turbine in a serial flow arrangement. A low pressure turbine is positioned axially aft of the core engine and the low pressure compressor is positioned axially forward of the core engine. The low pressure compressor is rotatably coupled to the low pressure turbine through the gearbox, which may be a speed-changing gearbox or a reduction gearbox, and is aligned axially with the gearbox. The core engine includes a high pressure rotor shaft and the gas turbine engine assembly includes a low pressure rotor shaft. The gas turbine engine includes a frame assembly which can comprise two or three frames.

The gas turbine assembly embodiment including a frame assembly comprising only three frames includes a forward frame member, a middle frame member, and an aft frame member. The forward frame member is positioned axially between the low pressure compressor and the high pressure compressor. The middle frame member is positioned axially between the high pressure turbine and the low pressure turbine. The aft frame member is positioned axially aft of the low pressure turbine. The middle and aft frame members are configured to rotatably support an aft end portion of the high pressure rotor shaft and an aft end portion of the low pressure rotor shaft. At the forward end, the engine fan assembly is directly coupled to the low pressure compressor and consequently the fan assembly and the low pressure compressor rotate at a same speed. Because the fan assembly and the low pressure compressor are coupled to the LP turbine through the gearbox, the fan assembly and the low pressure compressor may rotate at a speed that is the same or that is different than a speed of rotation of the low pressure turbine depending on the configuration of the gearbox. In various embodiments, the fan assembly and the low pressure compressor rotate at a first speed and the low pressure turbine rotates at a second speed. The first and second speeds can be the same; the first speed can be greater than or less than the second speed depending, in some embodiments, on a configuration of the gearbox. The gas turbine assembly embodiment including a frame assembly comprising only two frames eliminates the aft frame and includes a forward frame member and a middle frame member.

A method of assembling a three-frame gas turbine engine includes providing a core gas turbine engine including a high pressure compressor, a combustor, and a turbine coupled together in axial flow communication, coupling a low pressure turbine to a first shaft axially aft of the core gas turbine engine, coupling an input of a gearbox to the first shaft axially forward of the core gas turbine engine, and coupling a fan assembly and a low pressure compressor to an output of the gearbox axially aft of the gearbox.

Embodiments described herein disclose coupling a low pressure compressor to the fan assembly in an integral drive configuration. Power is sent through the gearbox from the low pressure turbine to the fan and low pressure compressor as a common spool. Such a configuration eliminates the need for one frame of the engine and shortens the engine. The engine configuration described herein permits increasing the fan speed such that the low pressure compressor speed is increased thus reducing loading on the low pressure compressor and improving the pressure ratio possible from the low pressure compressor. Also increasing fan assembly speed is beneficial because this makes the fan more distortion tolerant or operable. Moreover, improvements in the fan tip speed range combined with lower fan pressure ratio result from the described configuration. Finally, locating the gearbox axially forward of the fan assembly permits quick access to the gearbox for maintenance.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member (shown in FIG. 2) or fan (shown in FIG. 2) to generate thrust. Engine 120 is coupled to at least one of wing 110 and fuselage 102, for example, in a pusher configuration (not shown) proximate tail 106.

Figure 2:
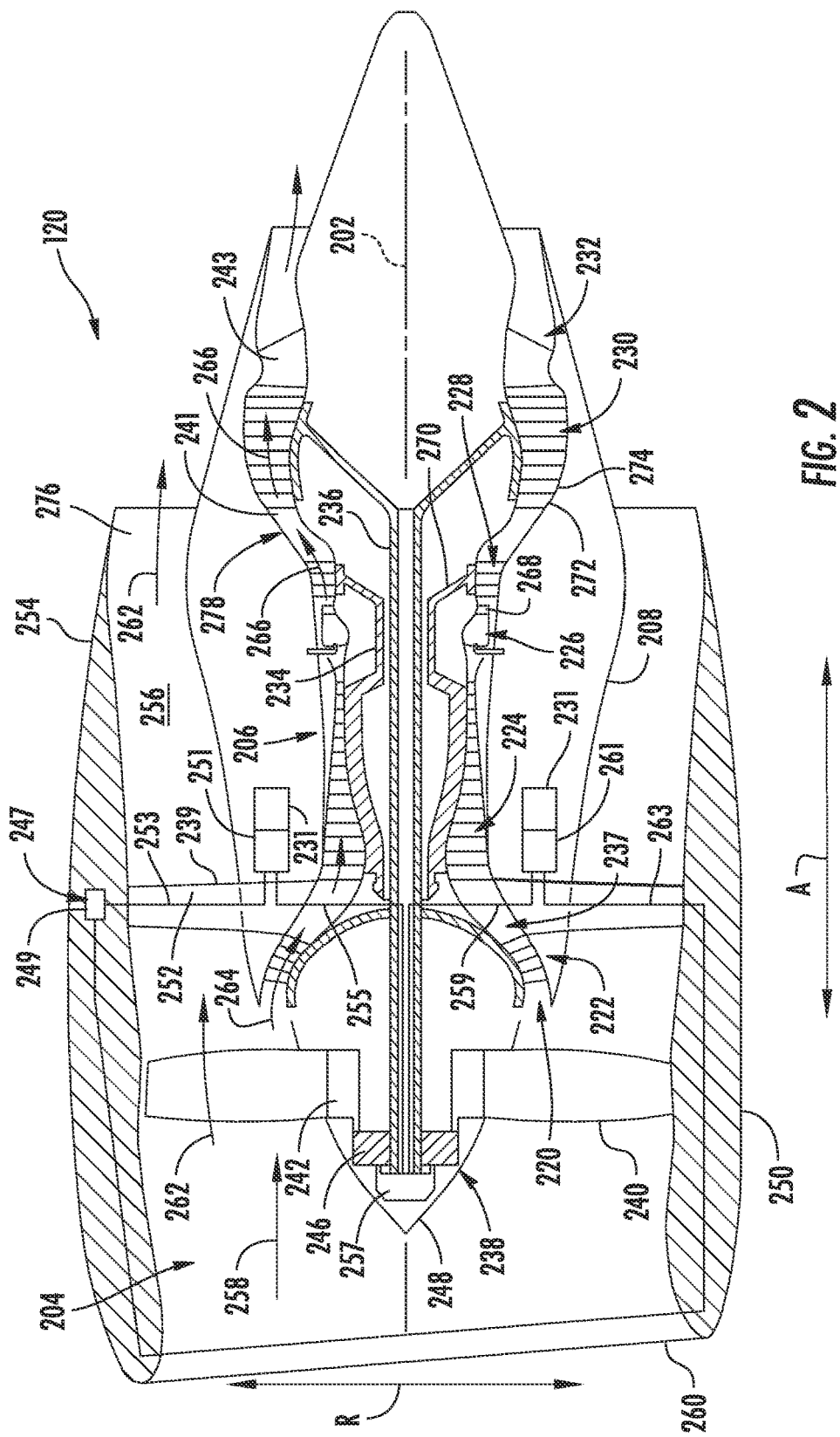

FIG. 2 is a schematic cross-sectional view of gas turbine engine 120 in accordance with an exemplary embodiment of the present disclosure. In the example embodiment, gas turbine engine 120 is embodied in a high bypass turbofan jet engine. As shown in FIG. 2, turbofan engine 120 defines an axial direction A (extending parallel to a longitudinal axis 202 provided for reference) and a radial direction R. In general, turbofan 120 includes a fan assembly 204 and a core turbine engine 206 disposed downstream from fan assembly 204.

In the example embodiment, core turbine engine 206 includes an approximately tubular outer casing 208 that defines an annular inlet 220. Outer casing 208 encases, in serial flow relationship, a compressor section including a booster or low pressure (LP) compressor 222 and a high pressure (HP) compressor 224; a combustion section 226; a turbine section including a high pressure (HP) turbine 228 and a low pressure (LP) turbine 230; and a jet exhaust nozzle section 232. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustion section 226, turbine section, and nozzle section 232 together define a core air flowpath 237. HP shaft 234 drives an accessory gearbox 231.

A forward frame member 239, a middle frame member 241, and an aft frame member 243 support gas turbine engine 120. Forward frame member 239 is disposed between LP compressor 222 and HP compressor 224. Middle frame member 241 is disposed between LP turbine 230 and HP turbine 228. Aft frame member 243 is disposed axially aft of LP turbine 230. Forward, middle, and aft frame members 239, 241, and 243 couple gas turbine engine 120 to either wing 110 or fuselage 102.

In another embodiment, aft frame member 243 is eliminated and gas turbine engine 120 is supported by forward frame member 239 and middle frame member 241.

In the example embodiment, fan assembly 204 includes a plurality of fan blades 240 coupled to a disk 242 in a spaced apart relationship. Fan blades 240 extend radially outwardly from disk 242 Fan blades 240, disk 242, and LP compressor 222 are together rotatable about longitudinal axis 202 by LP shaft 236 across a gearbox 246 disposed axially forward of fan assembly 204. Gearbox 246 includes a plurality of gears (shown in FIG. 3) for adjusting the rotational speed of fan 238 and LP compressor 222 relative to LP shaft 236 to a more efficient rotational speed. The LP compressor 222 speed can be adjusted to achieve an optimum overall pressure ratio (OPR).

Gearbox 246 is an epicyclic gear train which requires lubrication to cool the gears during operation. The lubricant used to lubricate gearbox 246 may include, without limitation, oil, synthetic oils, or any other lubricant. A lubrication system 247 supplies lubrication to gearbox 246. Lubrication system 247 includes a lubrication tank 249, a lubrication supply pump 251, a supply pump conduit 253, a gearbox supply conduit 255, a lubrication scavenge pump 257, a return pump conduit 259, a lubrication return pump 261, and a lubrication tank conduit 263. Lubrication tank 249 is coupled in flow communication with lubrication supply pump 251 by supply pump conduit 253 which directs lubrication through forward frame 239 to lubrication supply pump 251. Lubrication supply pump 251 is driven by accessory gearbox 231. Lubrication supply pump 251 is coupled in flow communication with gearbox 246 by gearbox supply conduit 255. Lubrication scavenge pump 257 is disposed axially forward of gearbox 246 and pumps scavenged lubrication axially aft to lubrication return pump 261 through return pump conduit 259. Lubrication return pump 261 is driven by accessory gearbox 231 and is coupled in flow communication with lubrication tank 249 by lubrication tank conduit 263 which directs scavenged lubrication through forward frame 239. In an alternative embodiment, lubrication return pump 261 is driven by an electrical motor (not shown).

Disk 242 is covered by rotatable front hub 248 aerodynamically contoured to promote an airflow through the plurality of fan blades 240. Additionally, fan assembly 204 includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween.

During operation of turbofan engine 120, a volume of air 258 enters turbofan 120 through an associated inlet 260 of nacelle 250 and/or fan assembly 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through HP compressor 224 and into combustion section 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to outer casing 208 and HP turbine rotor blades 270 that are coupled to HP shaft or spool 234, thus causing HP shaft or spool 234 to rotate, which then drives a rotation of HP compressor 224.

Combustion gases 266 are then routed through LP turbine 230 where a second portion of thermal and kinetic energy is extracted from combustion gases 266 via sequential stages of LP turbine stator vanes 272 that are coupled to outer casing 208 and LP turbine rotor blades 274 that are coupled to LP shaft or spool 236, which drives a rotation of LP shaft or spool 236, LP compressor 222, and rotation of fan 238 across gearbox 246.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of turbofan 120, also providing propulsive thrust. HP turbine 228, LP turbine 230, and jet exhaust nozzle section 232 at least partially define a hot gas path 278 for routing combustion gases 266 through core turbine engine 206.

Exemplary turbofan engine 120 depicted in FIG. 2 is by way of example only, and that in other embodiments, turbofan engine 120 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

Figure 3:
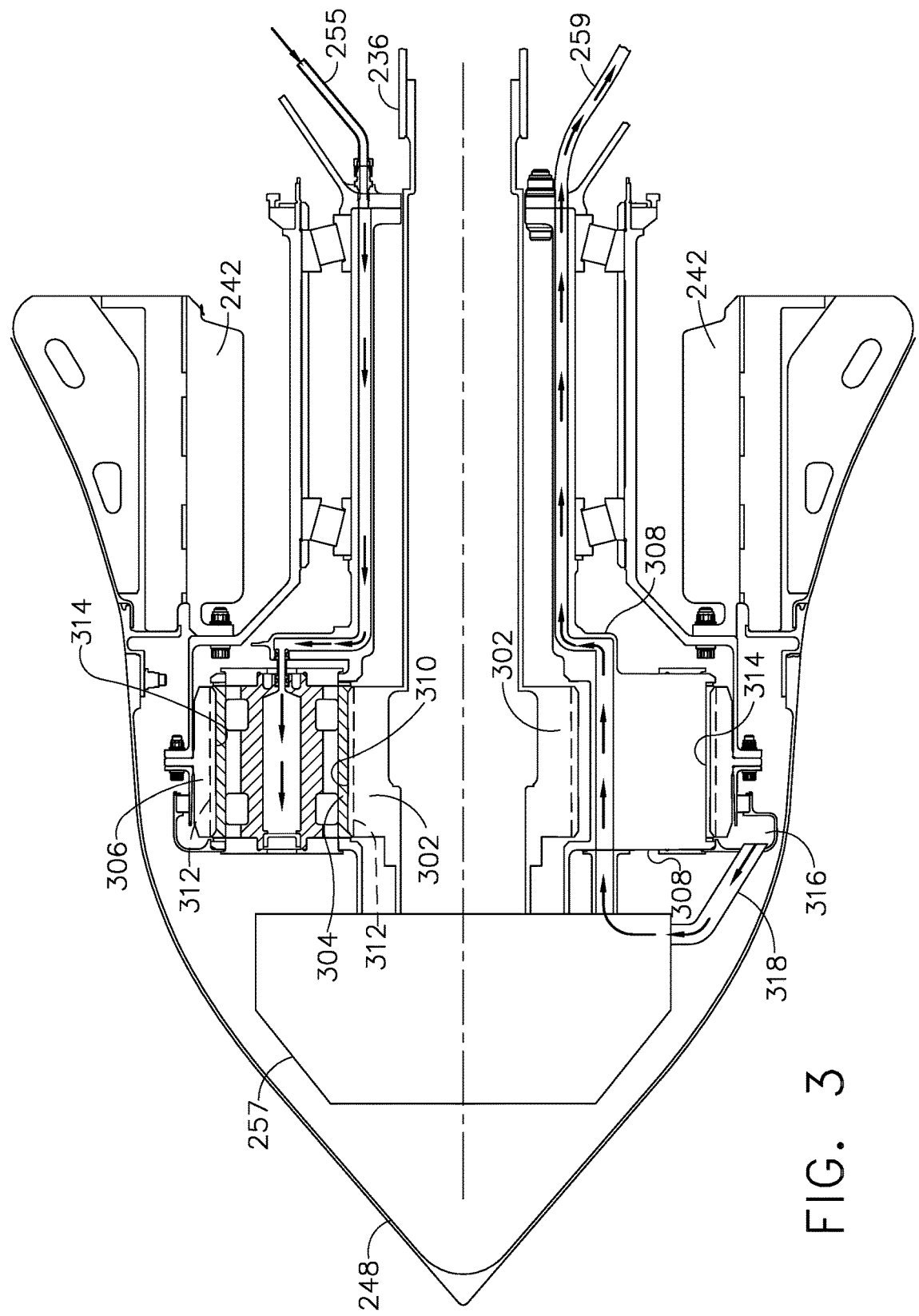

FIG. 3 is a side elevation view of a forward portion of turbofan engine 120 (shown in FIGS. 1 and 2). In the example embodiment, gearbox 246 and lubrication scavenge pump 257 are positioned axially forward of fan assembly 204 and within hub 248. Such relative position permits quick access to gearbox 246 and lubricant scavenge pump 257 for maintenance. In the example embodiment, gearbox 246 includes a sun gear 302, a plurality of planetary gears 304, a ring gear 306, and a gearbox housing 308. In alternative embodiments, gearbox 246 is not limited to a particular number of planetary gears 304, but rather may include any number of planetary gears 304 that permits gearbox 246 to perform as describe herein. LP shaft or spool 236 is fixedly coupled to sun gear 302. Sun gear 302 is configured to engage planetary gears 304 through a plurality of complementary sun gear teeth 310 and a plurality of complementary planet gear teeth 312 circumferentially spaced about a radially outer periphery of sun gear 302 and a radially outer periphery of planetary gears 304 respectively. Planetary gears 304 are maintained in a position relative to each other using gearbox housing 308. Planetary gears 304 are configured to engage ring gear 306 through a plurality of complementary ring gear teeth 314 and complementary planet gear teeth 312 circumferentially spaced about a radially inner periphery of ring gear 306 and a radially outer periphery of planetary gears 304 respectively. Ring gear 306 is rotationally coupled to fan blades 240 (shown in FIG. 2) and disk 242 extending axially from ring gear 306. LP turbine 230 rotates the input to gearbox 246 at a constant speed and torque ratio which is determined by a function of ring gear teeth 314, planet gear teeth 312, and sun gear teeth 310 as well as how gearbox 246 is restrained.

Gearbox housing 308 remains stationary while sun gear 302 and ring gear 306 rotate. LP shaft or spool 236 drives sun gear 302 which is configured to rotate planetary gears 304. Planetary gears 304 are configured to rotate ring gear 306 and gearbox housing 308 is fixedly coupled to gearbox 246. Gearbox housing 308 maintains planetary gears 304 positioning while allowing planetary gears 304 to rotate.

Ring gear 306 is rotationally coupled to fan blades 240 and disk 242. Sun gear 302 and ring gear 306 rotate in opposite directions.

A stationary gearbox housing 308 allows gearbox supply conduit 255 and return pump conduit 259 to couple to a non-rotating portion of gearbox 246 to channel lubrication to and from gearbox 246. Scavenged lubricant collects in a lubrication sump 316. Lubrication scavenge pump 257 draws the scavenged lubricant through a pump conduit 318 from lubrication sump 316. Lubrication scavenge pump 257 channels scavenged lubricant through gearbox housing 308 to return pump conduit 259 which channels it to lubrication return pump 261.

Figure 4:
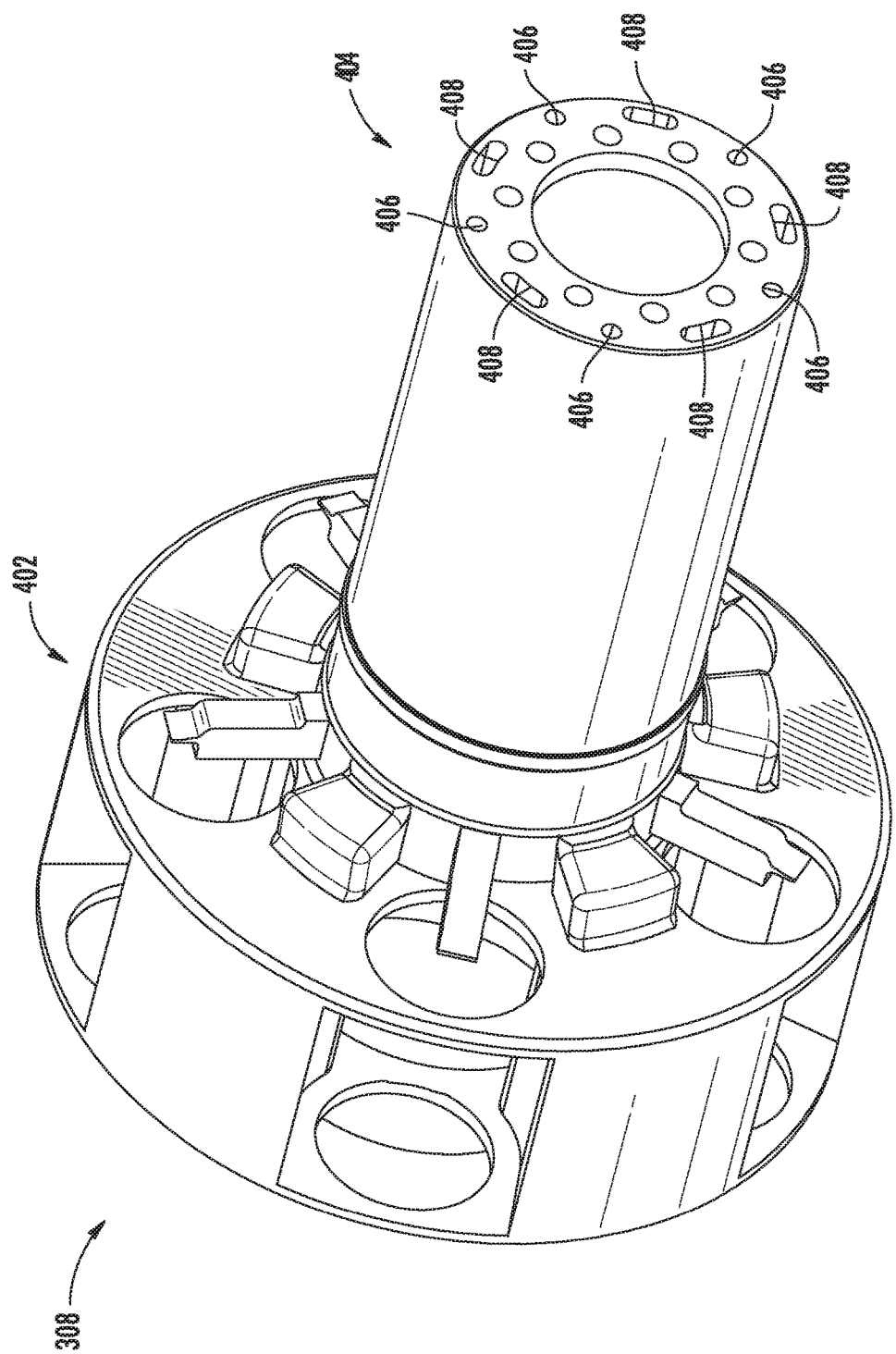
Figure 5:
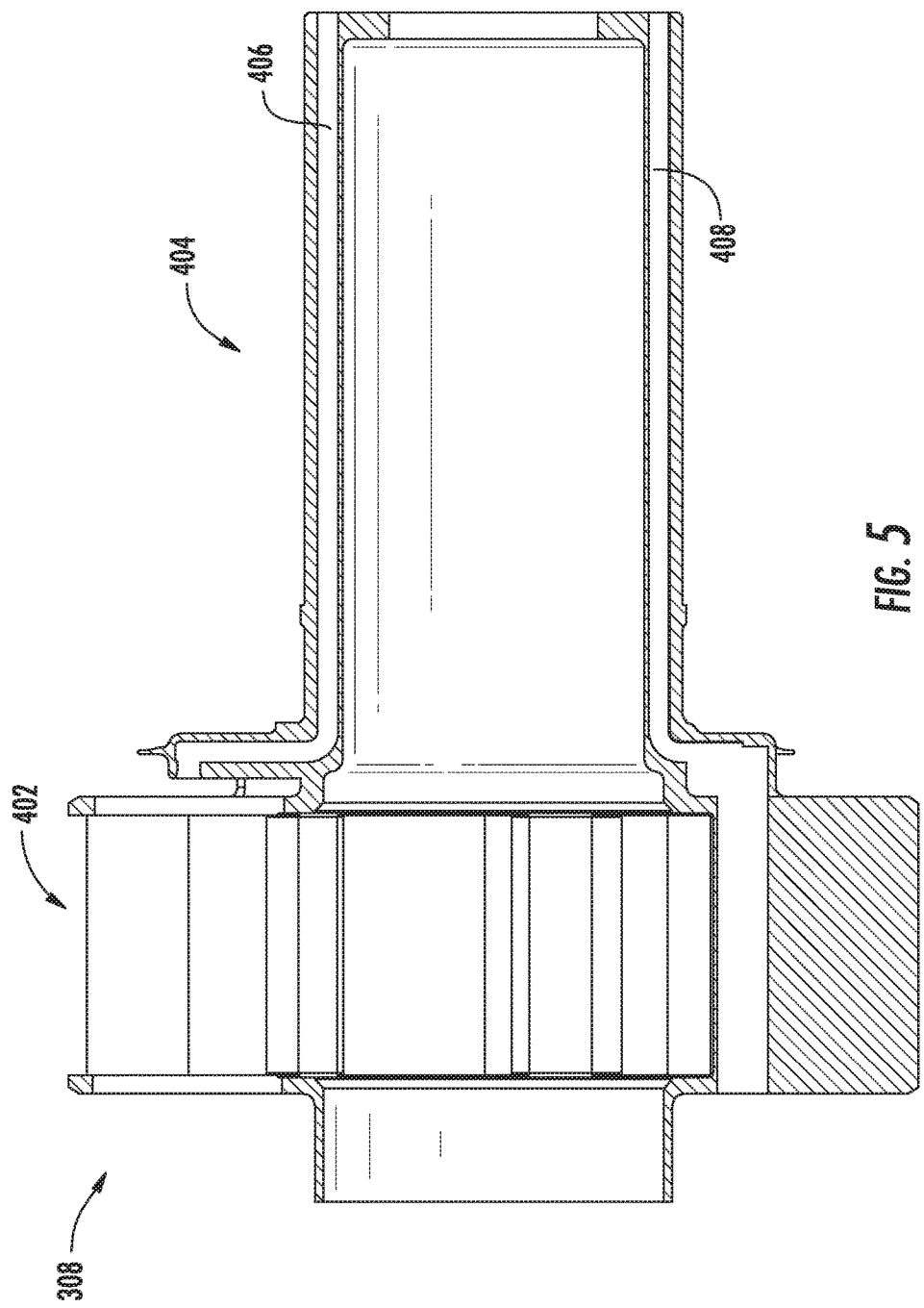
Figure 6:
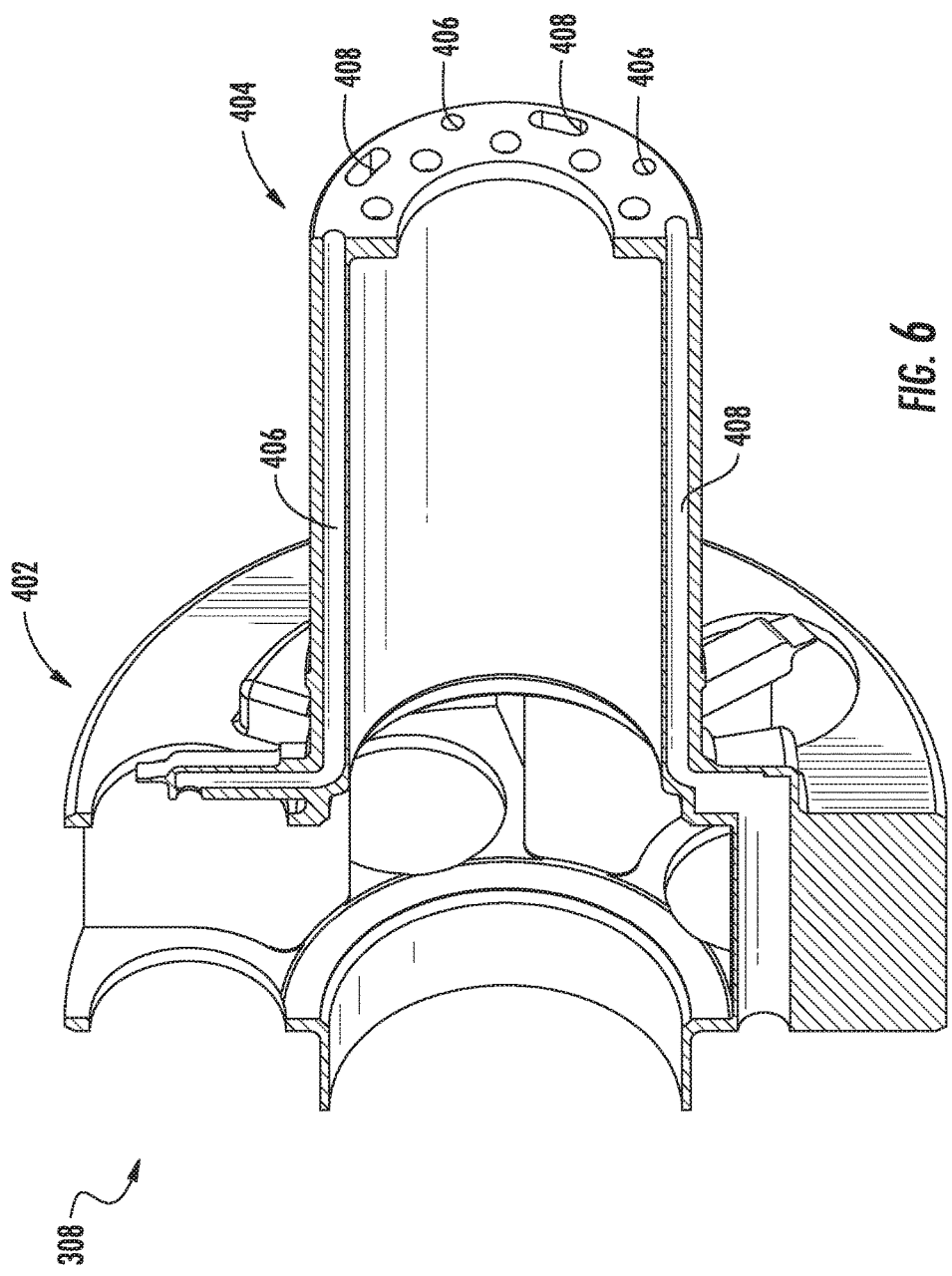
Figure 7:
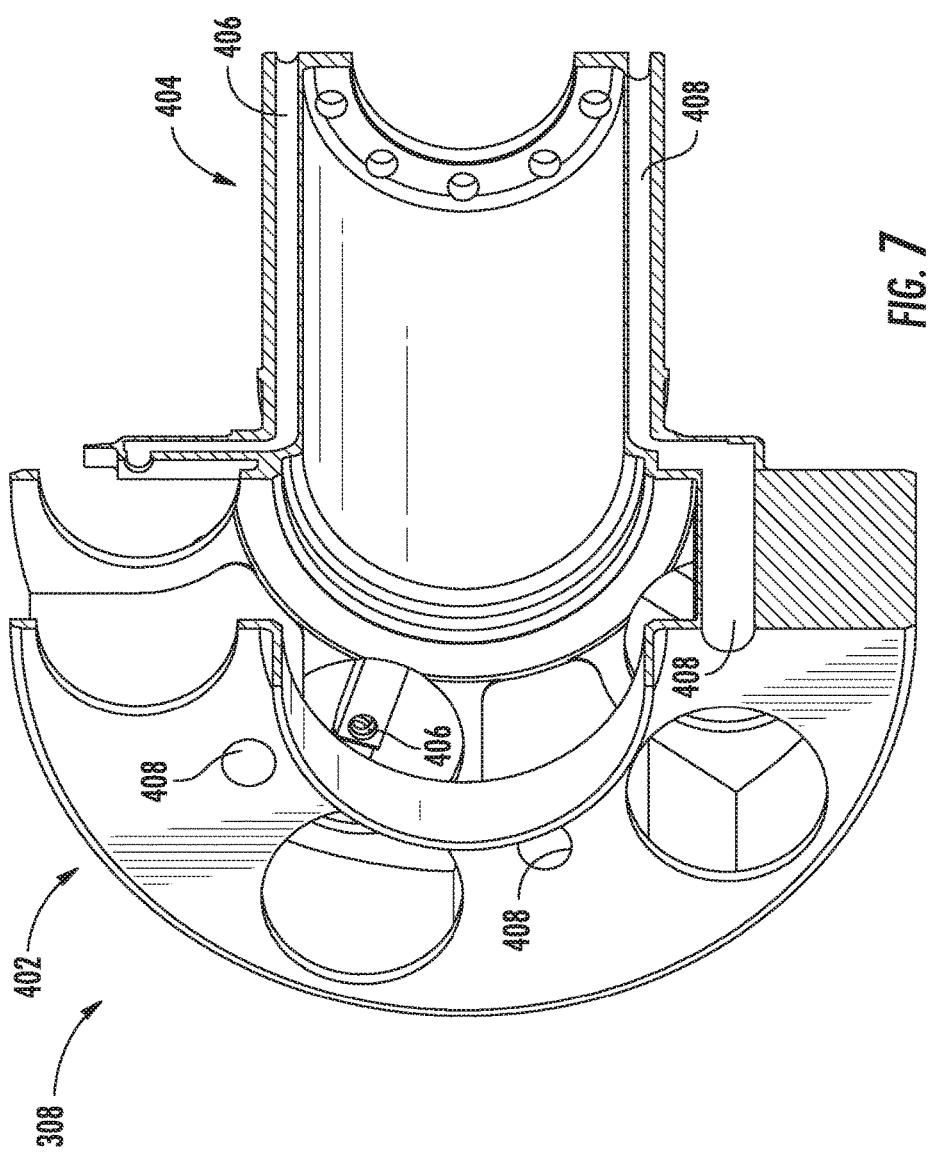

FIG. 4 is a perspective view of the gearbox housing shown in FIG. 3. FIG. 5 is a cut-away side elevation view of the gearbox housing shown in FIG. 3. FIGS. 6 and 7 are perspective cut-away views of the gearbox housing shown in FIG. 3. Gearbox housing 308 includes a carrier 402 coupled to a LP shaft jacket 404 extending axially aft from carrier 402. LP shaft jacket 404 partially encases LP shaft or spool 236. Carrier 402 maintains planetary gears 304 positioning while allowing planetary gears 304 to rotate.

A plurality of gearbox housing lubrication supply conduits 406 extend through LP shaft jacket 404 to carrier 402. Gearbox housing lubrication supply conduits 406 are couple in fluid communication with planetary gears 304 which, in turn, each distributes lubricant to sun gear 302 and ring gear 306. During operation, gearbox supply conduit 255 channels lubrication from lubrication supply pump 251 to gearbox housing lubrication supply conduits 406. Planetary gears 304 receive lubricant from gearbox housing lubrication supply conduits 406 and distribute lubricant to sun gear 302 and ring gear 306.

A plurality of gearbox housing lubrication scavenge conduits 408 extend through LP shaft jacket 404 to carrier 402. Gearbox housing lubrication scavenge conduits 408 are coupled in fluid communication with lubrication scavenge pump 257. During operation, lubrication scavenge pump 257 draws scavenged lubricant through pump conduit 318 from lubrication sump 316. Gearbox housing lubrication scavenge conduits 408 receives scavenged lubricant from lubrication scavenge pump 257 and channels scavenged lubricant to return pump conduit 259. Return pump conduit 259 channels scavenged lubricant to lubrication return pump 261.

Figure 8:
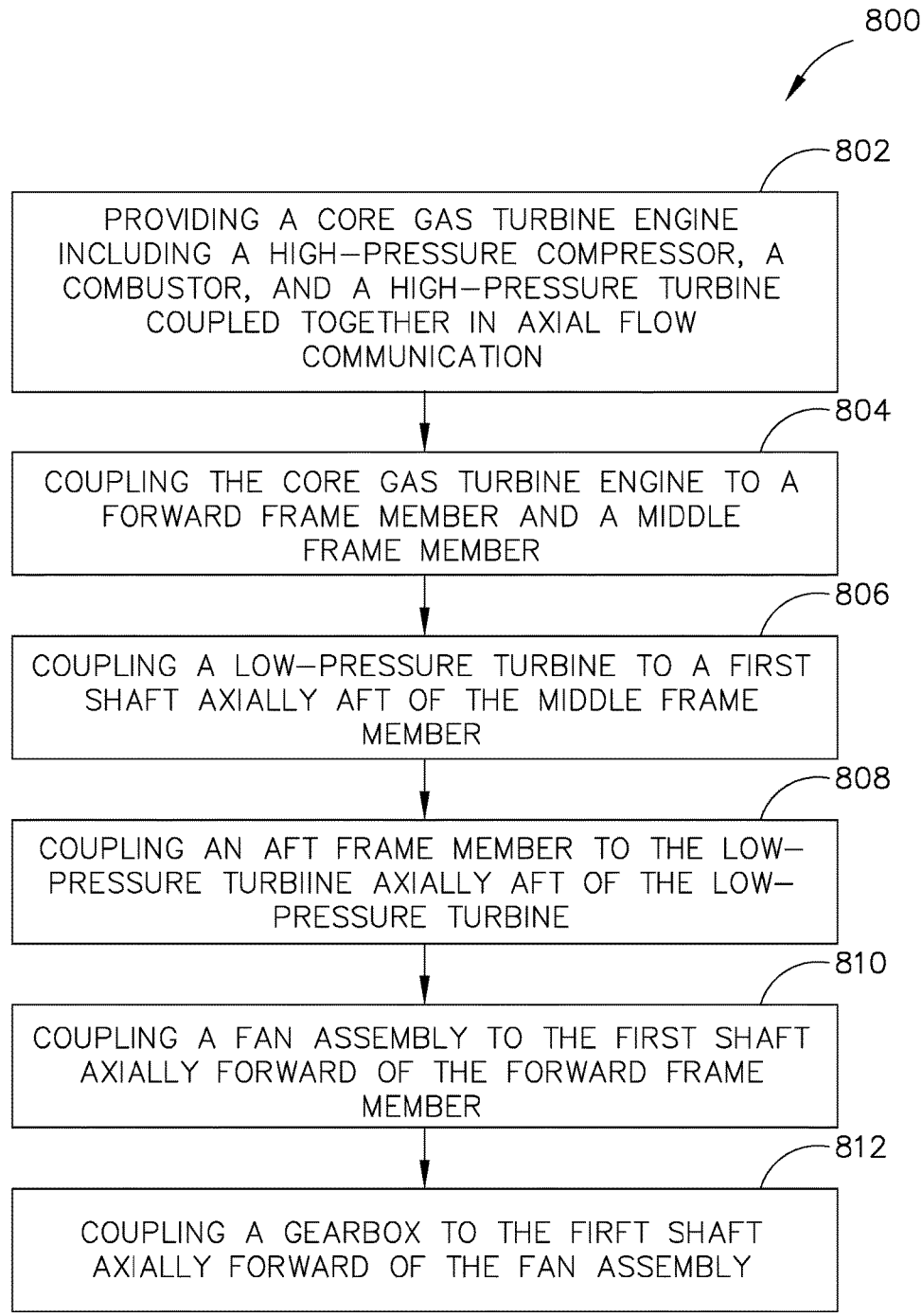

FIG. 8 is a flow diagram of a method 800 of constructing a gas turbine engine, such as, gas turbine engine 120 (shown in FIG. 1). Method 800 includes providing 802 core turbine engine 206 including HP compressor 224, combustion section 226, and HP turbine 228 coupled together in axial flow communication. Method 800 also includes coupling 804 core turbine engine 206 to forward frame member 239 and middle frame member 241. Method 800 further includes coupling 806 LP turbine 230 to LP shaft 236 axially aft of middle frame member 241. Method 800 also includes coupling 808 aft frame member 243 to LP turbine 230 axially aft of LP turbine 230. Method 800 further includes coupling 810 a fan assembly 204 to LP shaft 236 axially forward of the forward frame member 239. Method 800 also includes coupling 812 a gearbox 246 to LP shaft 236 axially forward of fan assembly 204.

The above-described embodiments of a method and system of a reduced frame gas turbine engine assembly provides a cost-effective and reliable means for reducing length, weight, and cost of the gas turbine engine assembly. More specifically, the methods and systems described herein facilitate increasing the fan speed such that the low pressure compressor speed is increased thus reducing loading on the low pressure compressor and improving pressure ratio possible from the low pressure compressor. Also increasing fan assembly speed is beneficial to make the fan more distortion tolerant or operable. Moreover, improvements in the fan tip speed range combined with lower fan pressure ratio result from the described configuration. As a result, the methods and systems described herein facilitate improving the fan tip speed range and permitting a lower fan pressure ratio in a shorter, lighter engine in a cost-effective and reliable manner. Finally, locating the gearbox axially forward of the fan assembly permits quick access to the gearbox for maintenance.

Exemplary embodiments of a method and system for the integral drive gas turbine engine are described above in detail. The integral drive gas turbine engine, and methods of assembling such systems and devices are not limited to the specific embodiments described herein, but rather, components of systems and/or steps of the methods may be utilized independently and separately from other components and/or steps described herein. For example, the methods may also be used in combination with other systems requiring a integral drive gas turbine engine, and are not limited to practice with only the systems and methods as described herein. Rather, the exemplary embodiment can be implemented and utilized in connection with many other machinery applications that are currently configured to receive and accept systems for an integral drive gas turbine engine.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a three-frame gas turbine engine, the method comprising:
 providing an engine core, the engine core including a high pressure compressor, a combustor, and a high pressure turbine each coupled together in a serial flow arrangement;
 coupling the engine core to a forward frame member and a middle frame member;
 coupling a low pressure turbine to a first shaft, the low pressure turbine positioned axially aft of the middle frame member and axially aft of the engine core;
 coupling an aft frame member to the low pressure turbine, the aft frame member positioned axially aft of the low pressure turbine;
 coupling a fan assembly to the first shaft, the fan assembly positioned axially forward of the forward frame member and axially forward of the engine core;
 coupling a low pressure compressor to the first shaft, the low pressure compressor positioned between the engine core and the fan assembly;
 coupling a gearbox to the first shaft, the gearbox positioned axially forward of the fan assembly;
 providing a lubrication system in flow communication with the gearbox, the lubrication system comprising a lubricant scavenge pump and a lubrication supply pump, the lubricant scavenge pump being positioned axially forward of the gearbox; and providing a forward frame member positioned axially between the low pressure compressor and the high pressure compressor, wherein the lubrication system is configured to direct lubricant through the forward frame member, and wherein the lubrication supply pump is positioned aft of the forward frame member.

2. The method of claim 1, wherein the low pressure compressor is positioned axially forward of the forward frame member and axially aft of the fan assembly.

3. The method of claim 1, wherein the middle frame member is positioned axially aft of the high pressure turbine.

4. A gas turbine engine assembly comprising:
a low pressure spool comprising:
a low pressure compressor,
a fan assembly positioned axially forward of said low pressure compressor, and
a gearbox positioned axially forward of said fan assembly;
the gas turbine engine assembly further comprising:
a lubrication system in flow communication with said gearbox, wherein said lubrication system comprises a lubricant scavenge pump and a lubrication supply plump, said lubricant scavenge pump being positioned axially forward of said gearbox; and
a forward frame member positioned axially aft of said low pressure compressor, wherein said lubrication system is configured to direct lubricant to and from said gearbox through said forward frame member, and wherein said lubricant supply pump is positioned aft of said forward frame member.

5. The gas turbine engine assembly of claim 4, the low pressure spool further comprising a low pressure turbine, wherein said low pressure compressor is rotatably coupled to the low pressure turbine through said gearbox.

6. The gas turbine engine assembly of claim 4, the low pressure spool further comprising a low pressure turbine, wherein said low pressure compressor and said fan assembly are rotatably coupled to the low pressure turbine through said gearbox.

7. The gas turbine engine assembly of claim 4, wherein said gearbox comprises a gearbox housing, said gearbox housing being configured to channel lubricant to said gearbox and channel scavenged lubricant from said lubricant scavenge pump axially aft toward a core engine.

8. A gas turbine engine assembly comprising:
a core engine comprising a high pressure compressor, a combustor, and a high pressure turbine in a serial flow arrangement;
a low pressure turbine positioned axially aft of said core engine;
a fan assembly positioned axially forward of said core engine;
a low pressure compressor positioned between said core engine and said fan assembly;
a gearbox positioned axially forward of said fan assembly;
a lubrication system in flow communication with said gearbox, wherein said lubrication system comprises a lubricant scavenge pump and a lubrication supply pump, said lubricant scavenge pump being positioned axially forward of said gearbox; and
a forward frame member positioned axially between said low pressure compressor and said high pressure com-
pressor, wherein said lubrication system is configured to direct lubricant through said forward frame member, and wherein said lubrication supply pump is positioned aft of said forward frame member.

9. The gas turbine engine assembly of claim 8, wherein said low pressure compressor is rotatably coupled to said low pressure turbine through said gearbox.

10. The gas turbine engine assembly of claim 8, wherein said low pressure compressor and said fan assembly are rotatably coupled to said low pressure turbine through said gearbox.

11. The gas turbine engine assembly of claim 10, wherein said gearbox is configured to reduce each of a speed of said low pressure compressor and a speed of said fan assembly relative to a speed of an input shaft.

12. The gas turbine engine assembly of claim 8 further comprising a frame assembly comprising only three frame members, the three frame members consisting of: the forward frame member, a middle frame member positioned axially between said high pressure turbine and the low pressure turbine, and an aft frame member positioned axially aft of said low pressure turbine.

13. The gas turbine engine assembly of claim 12 further comprising a longitudinal centerline, wherein each of said forward frame member, said middle frame member, and said aft frame member are coaxially aligned with said longitudinal centerline.

14. The gas turbine engine assembly of claim 12, wherein said core engine comprises a high pressure rotor shaft and said gas turbine assembly further comprises a low pressure rotor shaft, said middle frame member configured to rotatably support an aft end portion of said high pressure rotor shaft and an aft end portion of said low pressure rotor shaft.

15. The gas turbine engine assembly of claim 14, wherein said aft frame member is configured to rotatably support the aft end portion of said high pressure rotor shaft and the aft end portion of said low pressure rotor shaft.

16. The gas turbine engine assembly of claim 8 further comprising a frame assembly comprising only two frame members, the two frame members consisting of: the forward frame member, and a middle frame member positioned axially between said high pressure turbine and the low pressure turbine.

17. The gas turbine engine assembly of claim 8, wherein said fan assembly is rotatably coupled to said low pressure turbine through said gearbox.

18. The gas turbine engine assembly of claim 8, wherein said gearbox comprises a gearbox housing configured to channel lubricant to said gearbox and channel scavenged lubricant from said lubricant scavenge pump axially aft toward said core engine.

19. The gas turbine engine assembly of claim 8, wherein the lubrication system further comprises:
a lubrication tank;
a lubrication return pump coupled in flow communication with the lubrication tank; and
wherein said lubrication supply pump is coupled in flow communication with said gearbox by a gearbox supply conduit, wherein the lubricant scavenge pump is configured to pump scavenged lubrication from the gearbox axially aft to the lubrication return pump and the lubrication tank via a lubrication tank conduit, the lubrication tank conduit extending through the forward frame member.

* * * * *